3,080,383
Δ²,⁵-11-OXYGENATED PREGNADIENES
John A. Zderic, Palo Alto, Calif., and Albert Bowers, Otto Halpern, and Belig Berkoz, Mexico City, Mexico, assignors, by mesne assignments, to Syntex Corporation, a corporation of Panama
No Drawing. Filed Jan. 31, 1962, Ser. No. 170,273
9 Claims. (Cl. 260—397.45)

The present invention relates to novel cyclopentanophenanthrene derivatives and to a process for the production thereof.

More particularly the present invention relates to novel Δ²,⁵-pregnadiene-17α,21-diol-11,20-dione and Δ²,⁵-pregnadiene-11β,17α,21-triol-20-one derivatives.

The novel compounds of the present invention are represented by the following formula:

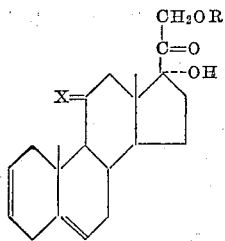

In the above formula X represents =O or

and R represents hydrogen or an acyl group derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds represented by the above formula have anti-inflammatory properties, glycogen deposition activity, involute the thymus and are anti-estrogenic and anti-gonadotrophic hormones.

The novel compounds of the present invention may be prepared by the process illustrated by the following equation:

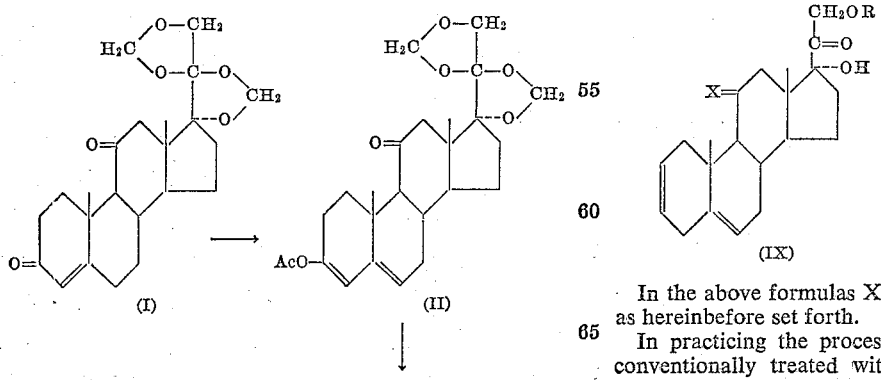

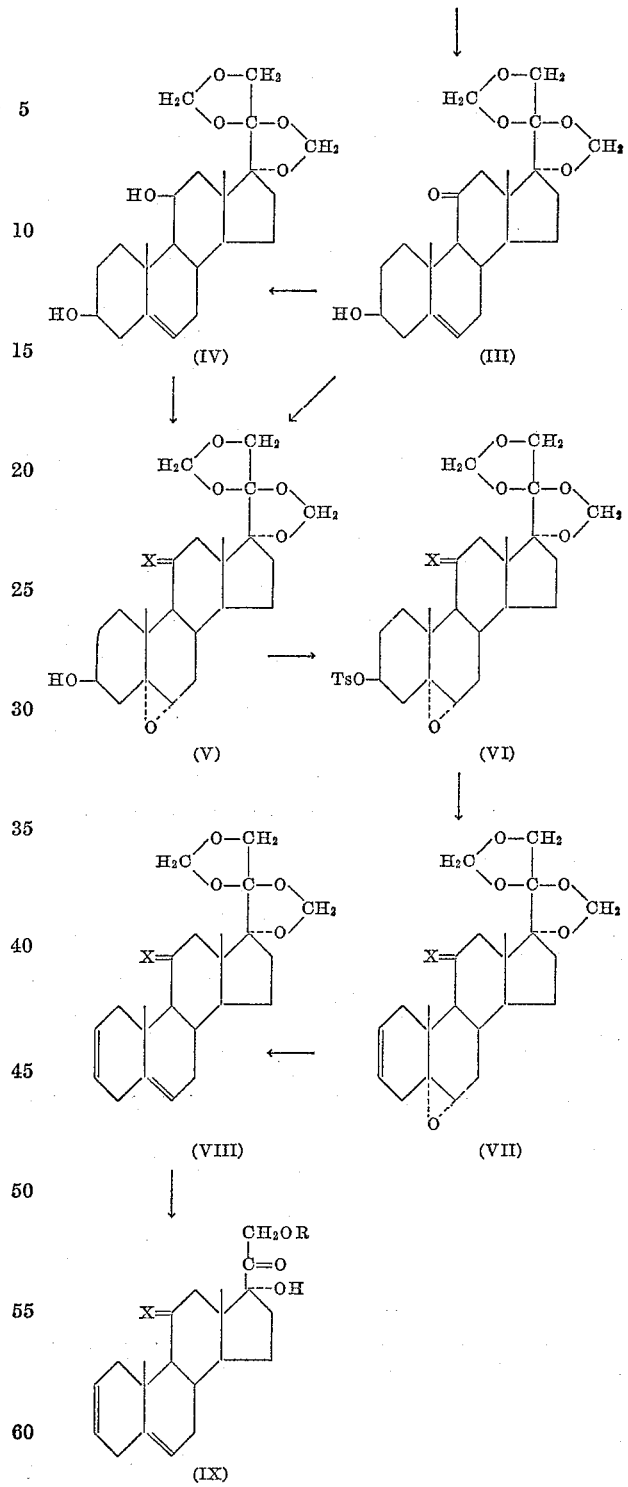

In the above formulas X and R have the same meaning as hereinbefore set forth.

In practicing the process outlined above, cortisone is conventionally treated with formaldehyde in the presence of an acid to give 17,20;20,21-bismethylenedioxy-Δ⁴-pregnene-3,11-dione (I). Treatment of the latter compound with acetic anhydride and acetyl chloride at boiling temperature for a period of time of the order of 4 hours yields 3-acetoxy-17,20;20,21-bismethylenedioxy-Δ³,⁵-pregnadien-11-one (II) which upon reduction with sodium borohydride gives 17,20;20,21-bismethylenedioxy-Δ⁵-pregnen-3β-ol-11-one (III). Further reduction of the latter compound with lithium aluminum hydride affords 17,20;20,21 - bismethylenedioxy - Δ⁵ - pregnene - 3β,11β-diol (IV). Treatment of compounds III or IV with an organic peracid, preferably monoperphthalic acid, gives the corresponding 5α,6α-oxido-17,20;20,21-bismethylenedioxy-pregnan-3β-ol derivative (V). The latter compound is treated with a lower hydrocarbon sulfonic acid chloride, preferably tosyl chloride, in a tertiary amine such as pyridine, thus affording the respective 3β-tosylate (VI) which upon dehydrotosylation with a suitable agent, such as lithium carbonate, in dimethylformamide at reflux temperature, for a period of time of the order of 3½ hours, yields the corresponding 5α,6α-oxido-17,20;20,21-bismethylenedioxy-Δ²-pregnene derivative (VII). The latter compound, upon treatment with sodium iodide, sodium acetate and zinc dust in acetic acid, gives the respective 17,20;20,21-bismethylenedioxy-Δ²,⁵-pregnadiene derivative (VIII). The reduction of the 11-keto compound (VIII: X=keto), preferably with lithium aluminum hydride, is an alternative way of producing the 11β-hydroxy derivative (VIII: X=hydroxyl). Conventional treatment of the 17,20;20,21-bismethylenedioxy derivatives with 60% formic acid at steam bath temperature, for a period of time of the order of 20 minutes, yields the corresponding Δ²,⁵-pregnadiene-17α,21-diol-20-one compounds (IX: R=hydrogen). Conventional acylation of the 21-hydroxyl of the latter products in pyridine with an acylating agent, as for example an anhydride of a hydrocarbon carboxylic acid of the type described hereinbefore, furnishes the corresponding 21-acylates (IX: R=acyl).

The following specific examples serve to illustrate but are not intended to limit the scope of the present invention:

Example I

To a solution of 5 g. of cortisone in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21-bismethylenedioxy-Δ⁴-pregnene-3,11-dione.

Example II

A solution of 5 g. of the foregoing steroid in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3-acetoxy-17,20;20,21-bismethylenedioxy-Δ³,⁵-pregnadien-11-one.

Example III

A solution of 1 g. of sodium borohydride in 3 cc. of water was added to an ice-cooled solution of 1 g. of the above steroid, in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 17,20;20,21-bismethylenedioxy-Δ⁵-pregnen-3β-ol-11-one.

Example IV

A solution of 1 g. of the foregoing compound in 50 cc. of tetrahydrofuran was added over a 30 minute period to a stirred suspension of 1 g. of lithium aluminum hydride in 50 cc. of anhydrous tetrahydrofuran. The mixture was refluxed for 12 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-Δ⁵-pregnene-3β,11β-diol.

Example V

A solution of 2.5 g. of 17,20;20,21-bismethylenedioxy-Δ⁵-pregnen-3β-ol-11-one in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 5α,6α-oxido-17,20;20,21-bismethylenedioxy-pregnan-3β-ol-11-one.

By the same procedure, 17,20;20,21-bismethylenedioxy-Δ⁵-pregnene-3β,11β-diol was converted into 5α,6α-oxido-17,20;20,21-bismethylenedioxy-pregnane-3β,11β-diol.

Example VI

A solution of 5 g. of 5α,6α-oxido-17,20;20,21-bismethylenedioxy-pregnan-3β-ol-11-one in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 3β-tosylate of the starting compound.

The total crude compound in 50 cc. of cold dimethylformamide was added over 15 minutes to a suspension of 5 g. of finely divided lithium carbonate in 25 cc. of refluxing dimethylformamide. The mixture was refluxed for 3½ hours further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Recrystallization afforded 5α,6α-oxido-17,20;20,21-bismethylenedioxy-Δ²-pregnen-11-one.

When applying the foregoing procedures to 5α,6α-oxido-17,20;20,21 - bismethylenedioxy - pregnane-3β,11β-diol, there were successively obtained the 3β-tosylate thereof and 5α,6α - oxido-17,20;20,21 - bismethylenedioxy - Δ²-pregnen-11β-ol.

Example VII

To 5 g. of 5α,6α-oxido-17,20;20,21-bismethylenedioxy-Δ²-pregnen-11-one in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 17,20;20,21 - bismethylenedioxy - Δ²,⁵-pregnadien-11-one.

5α,6α - oxido - 17,20;20,21 - bismethylenedioxy - Δ² - pregnen-11β-ol was treated following the foregoing procedure, thus giving 17,20;20,21-bismethylenedioxy-Δ$^{2,5}$-pregnadien-11β-ol.

*Example VIII*

A solution of 1 g. of 17,20;20,21-bismethylenedioxy-Δ$^{2,5}$-pregnadien-11-one in 50 cc. of tetrahydrofuran was added over a 30-minute period to a stirred suspension of 1 g. of lithium aluminum hydride in 500 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-Δ$^{2,5}$-pregnadien-11β-ol, identical with 11β-ol obtained in the foregoing example.

*Example IX*

1 g. of 17,20;20,21-bismethylenedioxy-Δ$^{2,5}$-pregnadien-11-one was heated on the steam bath with 20 cc. of 60% formic acid for 20 minutes, cooled, diluted with water and the precipitate was collected, washed with water, dried, and recrystallized from acetone hexane, thus affording Δ$^{2,5}$-pregnadiene17α,21-diol-11,20-dione.

By the same procedure 17,20;20,21 - bismethylenedioxy-Δ$^{2,5}$-pregnadien-11β-ol was converted into Δ$^{2,5}$-pregnadiene-11β,17α,21-triol-20-one.

*Example X*

A mixture of 1 g. of Δ$^{2,5}$-pregnadiene-17α,21-diol-11,20-dione, 4 cc. of pyridine and 2 cc. of acetic anhydride was kept at room temperature overnight, poured into ice water, the formed precipitate was filtered, washed with water and dried. Crystallization from acetone-hexane gave Δ$^{2,5}$-pregnadiene-17α,21-diol-11,20-dione-21-acetate.

Δ$^{2,5}$-pregnadiene-11β,17α,21-triol-20-one was treated by the above procedure, thus yielding Δ$^{2,5}$-pregnadiene-11β,17α,21-triol-20-one-21-acetate.

*Example XI*

Δ$^{2,5}$ - pregnadiene - 17α,21 - diol - 11,20 - dione and Δ$^{2,5}$-pregnadiene-11β,17α,21-triol-20-one, were treated by the procedure described in the foregoing example, but substituting acetic anhydride by propionic anhydride, caproic anhydride and cyclopentylpropionic anhydride, thus affording the respective 21-propionates, 21-caproates and 21-cyclopentylpropionates of the mentioned starting materials.

*Example XII*

A mixture of 1 g. of Δ$^{2,5}$-pregnadiene-17α,21-diol-11, 20-dione, 4 cc. of pyridine and 2 cc. of trimethyl-acetylchloride was kept at room temperature overnight, poured into ice water, the formed precipitate was filtered, washed with water and dried. Crystallization from acetone-hexane gave the 21-trimethyl acetate of Δ$^{2,5}$-pregnadiene-17α,21-diol-11,20-dione.

By the same procedure, Δ$^{2,5}$-pregnadiene-11β,17α,21-triol-20-one was converted into Δ$^{2,5}$-pregnadiene-11β,17α, 21-triol-20-one-21-trimethyl acetate.

We claim:

1. A compound of the following formula:

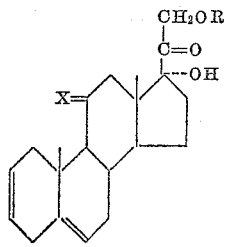

wherein X is selected from the group consisting of keto and β-hydroxy and R is selected from the group consisting of hydrogen and a hydrocarbon carboxylic acyl group of less than 12 carbon atoms.

2. Δ$^{2,5}$-pregnadiene-17α,21-diol-11,20-dione.
3. Δ$^{2,5}$-pregnadiene-11β,17α,21-triol-20-one.
4. Δ$^{2,5}$-pregnadiene-17α,21-diol-11,20-dione-21-acetate.
5. Δ$^{2,5}$-pregnadiene-11β,17α,21-triol-20-one-21-acetate.
6. Δ$^{2,5}$ - pregnadiene - 11β,17α,21 - triol - 20 - one - 21 - trimethylacetate.
7. Δ$^{2,5}$ - pregnadiene - 17α,21 - diol - 11,20 - dione - 21-trimethylacetate.
8. The hydrocarbon carboxylic acid esters of less than 12 carbon atoms of Δ$^{2,5}$-pregnadiene-17α,21-diol-11,20-dione.
9. The hydrocarbon carboxylic acid esters of less than 12 carbon atoms of Δ$^{2,5}$-pregnadiene-11β,17α,21-triol-20-one.

No references cited